Jan. 22, 1952
R. E. DAVIDSON
2,583,476
RETRIEVING TOOL
Filed Aug. 9, 1949
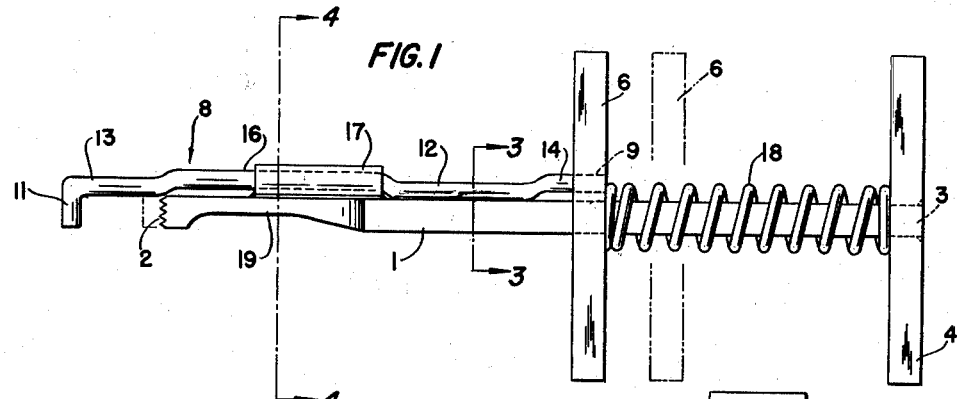
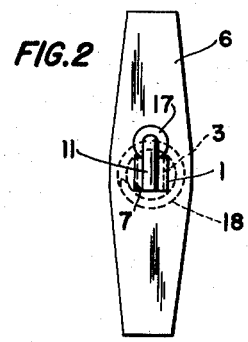
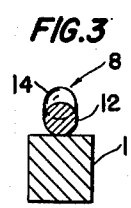
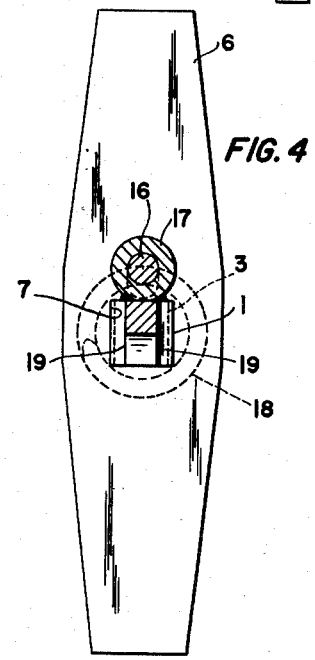
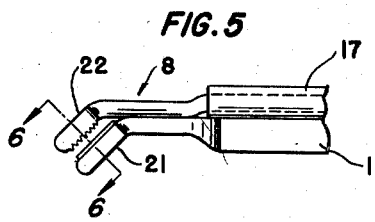
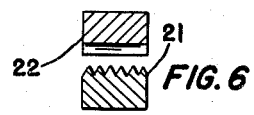
INVENTOR.
RUSSELL E. DAVIDSON
BY
ATTORNEYS

Patented Jan. 22, 1952

2,583,476

UNITED STATES PATENT OFFICE 2,583,476

RETRIEVING TOOL

Russell E. Davidson, Brady Lake, Ohio

Application August 9, 1949, Serial No. 109,361

2 Claims. (Cl. 294—103)

This invention relates to a tool adapted for retrieving objects located in places which are inaccessible to ordinary tools and is particularly adapted for removing fish hooks from the mouths or throats of fishes. Tools for this general purpose have been heretofore proposed but, for the most part, they have comprised complicated structures which are not well adapted to the requirements of ruggedness encountered in removing a fish hook. It is not merely a problem of forcibly removing the hook; the hook must first be manipulated to unseat the barb, and must then be removed with a positive grip.

In the device of the present invention the job of removing a hook is quickly, neatly and easily done by providing an elongated, narrow tool with a longitudinally extensible jaw having a slide mounting so constructed as to reenforce the jaws against relative movement during a twisting action.

It is, therefore, an object of the invention to provide an improved gripping tool for use in places which are difficult of access. A further object is to provide an elongate tool of the type having a longitudinally extensible jaw in which relative twisting at the jaws is minimized.

These and other ends which will be apparent to those skilled in the art are attained by the present invention, one preferred embodiment of which is described in the following specification and illustrated in the drawing, in which Fig. 1 is a plan view of the tool as a whole, Fig. 2 is a view from the left end of Fig. 1, Fig. 3 is a sectional view taken on the line 3—3 of Fig. 1, Fig. 4 is an enlarged sectional view taken on the line 4—4 of Fig. 1, Fig. 5 is a fragmental view in plan showing modified jaws, and Fig. 6 is a sectional view taken on the line 6—6 of Fig. 5.

Referring to the drawing by characters of reference, there is shown a shank 1 of square cross section with one end face serrated, as at 2, to form what may be termed the fixed jaw. The other end of shank 1 is reduced, as at 3, and is permanently secured in a rectangular opening in a cross bar or handle 4, as by screws, welding, or a shrink or force fit.

A movable handle 6 has a square passage 7 by which it is slidably received on the shank 1. A rod 8, of round cross-section, is secured at one end 9 in the handle 6 and has its other end 11 bent at right angles to form the movable jaw. The rod 8 is in contact with shank 1 in a region 12 and a region 13, and has an outwardly stepped portion 14 on the end 9 secured in handle 6, and also at 16. The latter portion slides in a tube 17 secured to the shank 1 as by welding.

A compression spring 18 surrounds the shank 1 and bears against handles 4 and 6 so as to constantly urge the movable jaw 11 to open position.

The shank 1 is preferably cut away, as at 19, to better enable insertion of the tool end in restricted openings.

It will be seen that by virtue of the sliding fit of square cross-section and the provision of tube 17 in the vicinity of the jaws, the latter are reenforced against relative sidewise motion when the tool is employed in a twisting movement. Also, by virtue of the stepped portions in rod 8, members 1 and 8 are brought into close, sliding association, and stepped portion 16 provides limits for movement of rod 8 in cooperation with the tube 17. When the fish hook is manipulated into position for removal, the grip of the jaws ensures positive withdrawal.

In Fig. 5 there is shown a modified pair of jaws slanted at about 45° to the longitudinal extent of the tool rather than at right angles. This provides even readier access into restricted openings. The fixed jaw 21 has teeth or serrations running lengthwise of the jaw, while the serrations of movable jaw 22 run laterally thereof. If desired, one or both jaw faces may be knurled.

While certain preferred embodiments of the invention have been shown and described, obviously the invention is not limited strictly thereto and various changes in the exact size, shape and location of the parts may be resorted to without departing from the spirit or scope of the appended claims.

What is claimed is:

1. A gripping and manipulating tool comprising a shank with a transverse handle at one end and a fixed jaw at the other end, a sleeve carried on the outer surface of said shank near the end thereof having the fixed jaw, a second handle slidably carried by the said shank in surrounding relation thereto but held against rotation with respect thereto, a rod member slidably received in said sleeve and attached to said second handle, and having a jaw in cooperating relation to said fixed jaw, said rod member being stepped to contact the said shank beyond the ends of the said sleeve and thus provide limits to sliding motion of the rod member, as well as provide a moment arm to reduce twist in said rod, and spring means surrounding the said shank and contacting both said handles to urge the said jaws apart.

2. A gripping and manipulating tool comprising a shank of rectangular cross-section, a handle fixed to one end of the shank and a fixed jaw on the other end of the shank, a second handle having a through opening of a shape complementary to that of the cross-section of the shank by which it is slidably carried thereon, a sleeve carried on the outer surface of said shank, a rod carried by the said second handle arranged alongside the shank and having an offset portion slidably received in the said sleeve, a jaw carried by the said rod in cooperative relation to the fixed jaw, and a helical spring surrounding the shank between said handles and urging the said handles apart.

RUSSELL E. DAVIDSON.

REFERENCES CITED

The following references are of record in the file of this patent:

UNITED STATES PATENTS

| Number | Name | Date |
|---|---|---|
| 960,070 | Brown | May 31, 1910 |
| 1,777,695 | Jeffery | Oct. 7, 1930 |
| 2,243,305 | Adler | May 27, 1941 |

FOREIGN PATENTS

| Number | Country | Date |
|---|---|---|
| 354,990 | Great Britain | Aug. 20, 1931 |